United States Patent

McAda

[11] 3,910,878
[45] Oct. 7, 1975

[54] LATENT OXYALKYLATION CATALYSTS

[75] Inventor: Robert William McAda, Lake Jackson, Tex.

[73] Assignee: The Dow Chemical Company, Midland, Mich.

[22] Filed: Mar. 25, 1971

[21] Appl. No.: 128,127

Related U.S. Application Data

[63] Continuation-in-part of Ser. No. 759,235, Sept. 11, 1968, Pat. No. 3,597,502.

[52] U.S. Cl.......... 260/209 R; 260/231; 260/233.3; 260/611 B; 260/612 R; 260/612 D; 260/613 B; 260/615 B; 260/922; 260/212

[51] Int. Cl.$^2$......................................... C07H 15/04

[58] Field of Search............ 260/209 R, 615 B, 611, 260/612, 613, 233.3

[56] References Cited
UNITED STATES PATENTS

| | | | |
|---|---|---|---|
| 3,165,508 | 1/1965 | Otey et al. | 260/209 R |
| 3,255,126 | 6/1966 | Fuzesi et al. | 260/209 R |
| 3,305,535 | 2/1967 | Merten et al. | 260/209 R |
| 3,350,389 | 10/1967 | Patton, Jr. et al. | 260/209 R |
| 3,372,201 | 3/1968 | Leary et al. | 260/615 B |
| 3,402,169 | 9/1968 | Jackson | 260/209 R |

*Primary Examiner*—Johnnie R. Brown
*Attorney, Agent, or Firm*—L. Wayne White; David H. Fifield

[57] ABSTRACT

New compounds of the general formula

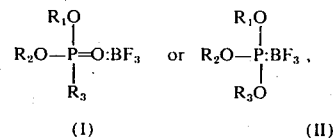

(I)            (II)

and the known compound

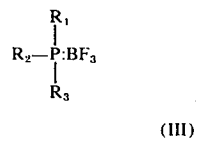

(III)

wherein $R_1$, $R_2$ and $R_3$ are each aryl, alkaryl, aralkyl, alkyl or haloalkyl of 1 to about 8 carbon atoms, are useful as new latent catalysts in the oxyalkylation reaction between a vicinal alkylene oxide and a hydroxy-containing organic compound.

10 Claims, No Drawings

LATENT OXYALKYLATION CATALYSTS

CROSS-REFERENCE TO RELATED APPLICATION

This is a continuation-in-part of my copending application bearing the same title, Ser. No. 759,235, filed Sept. 11, 1968, now U.S. Pat. No. 3,597,502.

BACKGROUND OF THE INVENTION:

In the oxyalkylation reaction between a vicinal alkylene oxide and an organic hydroxy-containing compound it is common to use a catalyst to obtain the advantage of higher reaction rates at lower temperatures.

$BF_3$ and $BF_3$·etherate are well-known catalysts in such an oxyalkylation reaction. The inherent problems of temperature control and product discoloration resulting from the use of $BF_3$ or $BF_3$·etherate as catalyst in the oxyalkylation reaction are also well-known.

Summary of the Invention:

It has now been discovered that new compounds of the general formula

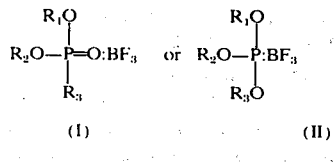

and the compound

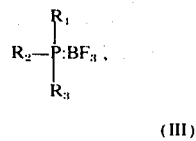

wherein $R_1$, $R_2$ and $R_3$ are each aryl, alkaryl, aralkyl, alkyl or haloalkyl of 1 to about 8 carbon atoms, are useful as new latent catalysts in the oxyalkylation reaction between a vicinal alkylene oxide and a hydroxy-containing organic compound.

The inventive compounds are surprisingly unreactive toward vicinal alkylene oxides, hydroxy-containing organic compounds, and mixtures of vicinal alkylene oxides and hydroxy-containing organic compounds at temperatures below about 120°C. However, at temperatures above about 120°C., the inventive compounds are effective catalysts in the oxyalkylation reaction between the above mentioned oxides and hydroxy-containing compounds. Said oxyalkylation reaction proceeds smoothly and without any violent exotherm in the presence of the novel catalysts. Thus, the previously mentioned problems of temperature control are substantially reduced.

Advantageously, the inventive compounds are mixed with at least one of the reactants in said oxyalkylation process prior to reaction and at a convenient temperature below about 120°C. This procedure insures a substantially even distribution of the catalyst throughout the reaction mixture and thus results in a more uniform product.

The inventive compounds are particularly valuable in catalyzing the oxyalkylation reaction between an alkylene oxide and a solid hydroxy-containing compound. The inventive compounds are most generally stable, low-viscosity liquids and therefore are easily blended into such solid hydroxy-containing compounds by simply stirring the catalyst and solid hydroxy-containing compound together, or the solid compound can be suspended in the liquid alkylene oxide or an inert solvent, and the catalyst then evenly blended into the mixture with stirring.

Mixing a catalytic amount of the inventive compounds with at least one of the oxyalkylation reactants at a temperature below about 120°C. is a process improvement in the oxyalkylation reaction between a vicinal alkylene oxide and a hydroxy-containing organic compound.

The compounds of the invention are conveniently prepared by reacting by contacting a compound of the formula

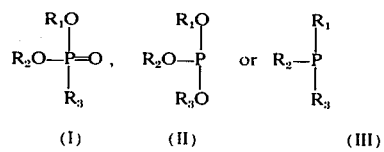

wherein $R_1$, $R_2$ and $R_3$ are each aryl, alkaryl, aralkyl, alkyl or haloalkyl of 1 to about 8 carbon atoms, with either $BF_3$ or $BF_3$·etherate at a temperature of between about 0°C. and about 120°C. This is conveniently done in either of two general procedures: (a) by bubbling gaseous $BF_3$ into the liquid phosphorus-containing compound or (b) by mixing substantially equimolar quantities of $BF_3$·etherate with the phosphorus-containing compound. If desired, the ether by-product resulting from the latter procedure may be removed by heating the mixture under reduced pressure.

It is desirable that no free $BF_3$ or $BF_3$·etherate be present in the product of the above reactions. Accordingly, at least equimolar quantities of the phosphorus-containing compound and $BF_3$ or $BF_3$·etherate are suitable in the above reactions and a molar excess of the phosphorus-containing component is preferred.

Examples of suitable phosphorus-containing compounds include: diethyl ethylphosphonate, dibutyl butylphosphonate; trimethyl-, triethyl-, tributyl-, trihexyl-, tris(2-chloroethyl)-, tricresyl-, triisooctyl-, triisopropyl-, triphenyl-, dimethyl ethyl-, dipropyl hexyl-phosphite; tri-n-butyl-phosphine, triphenylphosphine, and other like compounds.

The oxyalkylation reactants, other than the inventive catalysts are well-known. For example, suitable vicinal alkylene oxides include ethylene oxide, propylene oxide, butylene oxide, epichlorohydrin, other like compounds and mixtures thereof.

The suitable hydroxy-containing organic compounds include the aliphatic and cycloaliphatic alcohols, glycols, polyols, phenols, carbohydrates, and other hydroxy-containing compounds. Examples include ethanol, butanol, n-octanol, 3-methyl-2-butanol, isopropanol, 5-propyl-3-hexanol, 2-chloroethanol, cyclohexanol, sorbitol, starch, cellulose, pentaerythritol and the class of compounds known as the saccharides, i.e. glucose, sucrose, lactose, etc., phenol, resorcinol, m-cresol, hydroquinone, p-chlorophenol, ethylene glycol, propylene glycol, glycerol, hexanetriol, alkanolamines, trimethylene glycol, pinacol, and other like hydroxy-containing compounds. Preferred species in this class of hydroxy-containing compounds are those wherein the hydroxyl is primary or secondary, and most preferably is secondary.

The oxyalkylation reaction conditions of temperature, pressure and ratio of reactants are likewise well-known. Specific Embodiments:

The following examples further illustrate the invention:

EXAMPLE 1 Catalyst Preparation-$(CH_3O)_3P:BF_3$

To a vessel, which was in an ice-bath and had been purged with nitrogen, was charged 2.84 g. of $BF_3$·etherate. Then, 2.48 g. of trimethyl phosphite was added dropwise with stirring. After the addition was complete, the reaction mixture was removed from the bath and allowed to warm to about room temperature. A mild exotherm was observed which raised the temperature to about 40°C. during about a 30 min. interval. After the exotherm had subsided, the ethyl ether was removed under reduced pressure. There was recovered 3.85 g. of a straw-colored liquid product having the following analysis:

|     | Actual | Theory |
|-----|--------|--------|
| %P  | 16.7   | 16.15  |
| %B  | 5.5    | 5.64   |

Using substantially the procedure and molar ratio of reactants described in the example above, except the phosphorus-containing compound was varied, the following catalysts were prepared and analyzed:

It was found, by preparing catalysts 1, 2 and 3 according to both procedures above, that the catalyst composition is substantially the same whether the reaction temperature is about 0°–50°C. or about 100°–110°C. Accordingly, the compounds can be prepared at any convenient temperature between about 0°–120°C.

EXAMPLE 2 Reaction Between Sucrose and Epichlorohydrin

The following tabulated results are based on experiments wherein 0.025 moles of the phosphorus-containing compound were mixed with 0.006 moles of $BF_3$·etherate and the mixture was then heated to 100°–110°C. to insure complete reaction and drive off the ethyl ether. Run No. 6 differed from the above in that 0.030 moles of phosphorus-containing compound were used. In each experiment, the resulting catalytic complex was added at room temperature to 2.54 moles of epichlorohydrin (Epi), mixed, and allowed to stand for 15 min. Any rise in temperature during this time interval was recorded. Then 0.20 moles of sucrose was mixed in without any observable reaction. The reaction vessel was sealed and placed in a rotating steam autoclave at 130°C. for 16 hrs. After cooling, any volatile material remaining in the reaction mixture was removed under reduced pressure, and the residue weighed. In each case a brown viscous liquid was recovered and no trace of unreacted sucrose was present. The oxyalkylation reaction products were analyzed and the results reported as the number of moles of Epi per mole of sucrose. The catalyst for Run No. 9 was the $BF_3$·etherate alone without the complexing phosphorous compound, See Table I for results.

TABLE I

| Run No. | Phosphorus Compound | (g.) | Temp. Rise (°C.) | Final Recovered Product(g.) | Epi Reacted, Mols per Mol of Sucrose |
|---|---|---|---|---|---|
| 1 | Tris(chloroethyl) Phosphite | 6.6 | 1 | 232 | 8.6 |
| 2 | Trimethyl Phosphite | 3.1 | 2 | 231 | 8.7 |
| 3 | Tributyl Phosphite | 6.25 | 0 | 174 | 5.4 |
| 4 | Triisopropyl Phosphite | 5.2 | 0 | 186 | 6.1 |
| 5 | Tributyl Phosphine | 5.1 | 0 | 280 | 11.8 |
| 6 | Triphenyl Phosphine | 7.8 | 1 | 216 | 7.6 |
| 7 | Dibutyl butylphosphonate | 6.25 | 1 | 192 | 6.4 |
| 8 | Diethyl ethylphosphonate | 4.15 | 0 | 192 | 6.5 |
| 9 | None - control | — | 80 | — | — |

Similar results are obtained by using the remaining catalysts, prepared in Example 1, in the procedure of Example 2.

| Catalyst | | Product Analysis | | | |
|---|---|---|---|---|---|
| | | %P(a)* | %P(t)* | %B(a) | %B(t) |
| 1. | $(CH_3O)_3P:BF_3$ | 16.7 | 16.15 | 5.5 | 5.64 |
| 2. | $(C_2H_5O)_3P:BF_3$ | 13.5 | 13.85 | 4.6 | 4.83 |
| 3. | $(C_4H_9O)_3P:BF_3$ | 8.3 | 9.75 | 3.3 | 3.40 |
| 4. | $(C_6H_5O)_3P:BF_3$ | 7.3 | 8.20 | 2.3 | 2.86 |
| 5. | $(ClCH_2CH_2O)_3P:BF_3$ | 9.2 | 8.56 | 3.5 | 3.27 |

*(a) =actual percentage and (t) =theoretical percentage.

In a similar procedure, except that the reaction mixture was heated in a bath at about 100°–110°C. for 30 min. to insure complete reaction and to drive off the ethyl ether, the following catalysts were prepared:

| Catalyst | | Reactant |
|---|---|---|
| 6. | $[(CH_3)_2CHO]_3P:BF_3$ | $[(CH_3)_2CHO]_3P$ |
| 7. | $(C_4H_9)_3P:BF_3$ | $(C_4H_9)_3P$ |
| 8. | $(C_4H_9O)_2(C_4H_9)PO:BF_3$ | $(C_4H_9O)_2(C_4H_9)PO$ |
| 9. | $(C_2H_5O)_2(C_2H_5)PO:BF_3$ | $(C_2H_5O)_2(C_2H_5)PO$ |
| 10. | $(C_6H_5)_3P:BF_3$ | $(C_6H_5)_3P$ |

EXAMPLE 3 Reaction Between Sucrose and Other Epoxides

Using substantially the procedure and molar ratio of reactants of Example 2, sucrose was reacted with (a) phenyl glycidyl ether and (b) propylene oxide in the presence of the catalyst $(ClCH_2CH_2O)_3P:BF_3$. In each instance a light brown viscous liquid was obtained. The catalyst was prepared by the procedure of Example 2.

EXAMPLE 4 Reaction Between Pentaerythritol and Epichlorohydrin

Pentaerythritol (5 mols) was mixed with Epi (2.3 mols) in the presence of the catalyst $(ClCH_2CH_2O)_3P:BF_3$. The reaction mixture was heated for 18 hours at about 120°C. under autogenous pressure. The mixture was then cooled and volatiles removed under reduced pressure. The product was a light yellow viscous liquid. The catalyst was prepared by the procedure of Example 2.

The inventive compounds are therefore seen to be effective latent catalysts in the oxyalkylation reaction between vicinal alkylene oxides and organic hydroxy-containing compounds.

I claim:

1. A composition of matter comprising, at temperatures below about, 120°C.:
   a. a vicinal alkylene oxide;
   b. a hydroxy-containing organic compound; and
   c. at least one compound having the formula

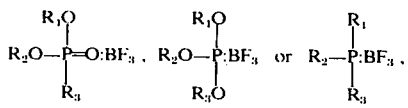

$R_1$, $R_2$ and $R_3$ are each independently aryl, aralkyl, alkaryl, alkyl, chloroalkyl or bromoalkyl of from 1 to about 8 carbon atoms, in amount sufficient to catalyze the oxyalkylation reaction between (a) and (b) at temperatures above about 120°C.

2. The composition of claim 1 wherein (c) has the formula

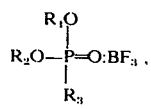

wherein $R_1$–$R_3$ have the aforesaid meaning.

3. The composition of claim 1 wherein said hydroxy-containing organic compound is at least one of ethylene glycol, propylene glycol, butylene glycol, glycerol, a saccharide, starch or pentaerythritol.

4. The composition of claim 3 wherein said hydroxy-containing organic compound is at least one of ethylene glycol, propylene glycol or butylene glycol.

5. The composition of claim 1 wherein each of $R_1$, $R_2$ and $R_3$ is methyl, ethyl, propyl or butyl.

6. The composition of claim 5 wherein said catalyst has the formula

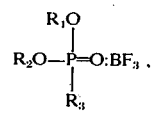

wherein $R_1$–$R_3$ have the aforesaid meaning.

7. The composition of claim 1 wherein said vicinal alkylene oxide is at least one alkylene oxide of from 2 to 4 carbon atoms and wherein said hydroxy-containing organic compound is a saccharide.

8. The composition of claim 7 wherein said vicinal alkylene oxide is propylene oxide and wherein said saccharide is sucrose.

9. The composition of claim 1 wherein one or more of the hydroxyl groups of said hydroxy-containing compound is a secondary hydroxyl group.

10. the composition of claim 1 wherein said vicinal alkylene oxide is at least one of ethylene oxide, propylene oxide, butylene oxide, phenyl glycidyl ether or epichlorohydrin.

* * * * *

UNITED STATES PATENT AND TRADEMARK OFFICE
CERTIFICATE OF CORRECTION

PATENT NO. : 3,910,878
DATED : October 7, 1975
INVENTOR(S) : Robert William McAda It is certified that error appears in the above-identified patent and that said Letters Patent are hereby corrected as shown below:

Column 3, line 5, "Specific Embodiments" should be at left margin as a title;

Column 4, line 12, "phosphoruscontaining" should read --phosphorus-containing--;

Column 5, line 21, before "$R_1$", insert --wherein--;

Column 5, line 35, "$R_1-R_3$" should read --$R_1-R_3$--;

Column 6, line 31, "the" should read --The--.

Signed and Sealed this

Thirty-first Day of August 1976

[SEAL]

*Attest:*

RUTH C. MASON
*Attesting Officer*

C. MARSHALL DANN
*Commissioner of Patents and Trademarks*